Feb. 17, 1953   R. W. BAILEY ET AL   2,628,520
MACHINE FOR ASSEMBLING A WORKPIECE ON ANOTHER PART
Filed May 8, 1952   7 Sheets-Sheet 1

INVENTOR.
ROY W. BAILEY
JOHN THOMAS FAULL.
BY
*Samuel C. Weisman*
ATTORNEY.

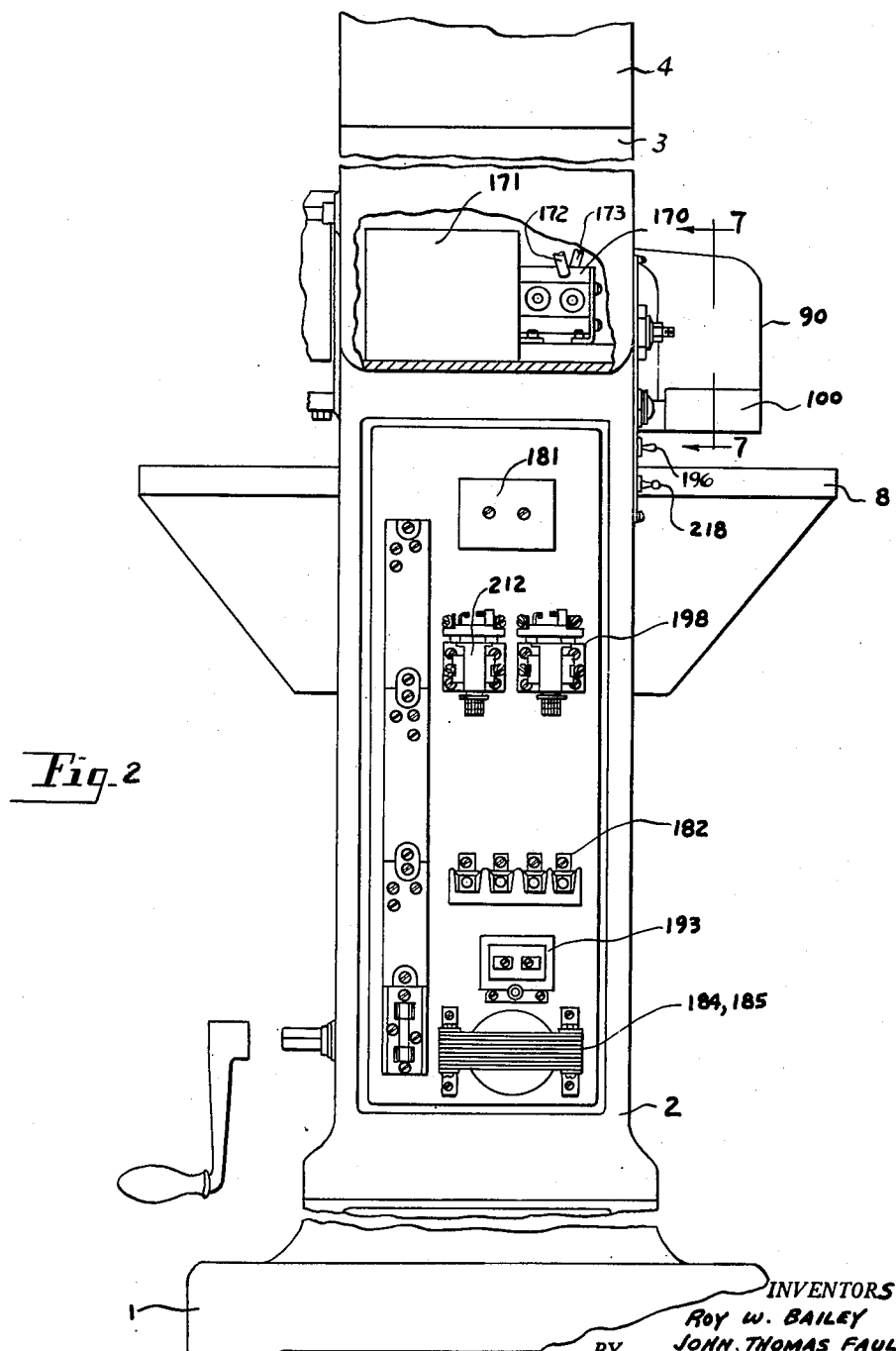

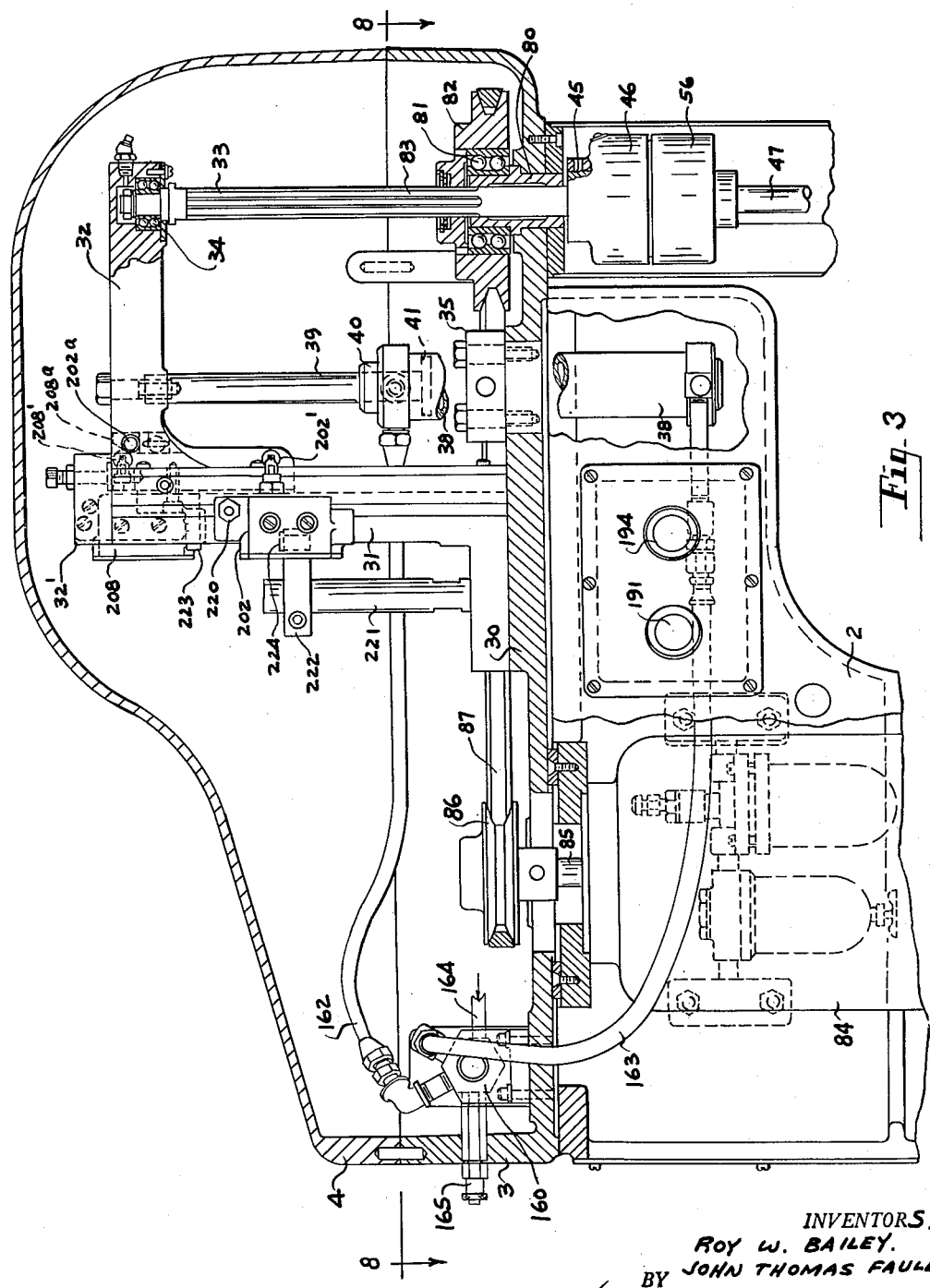

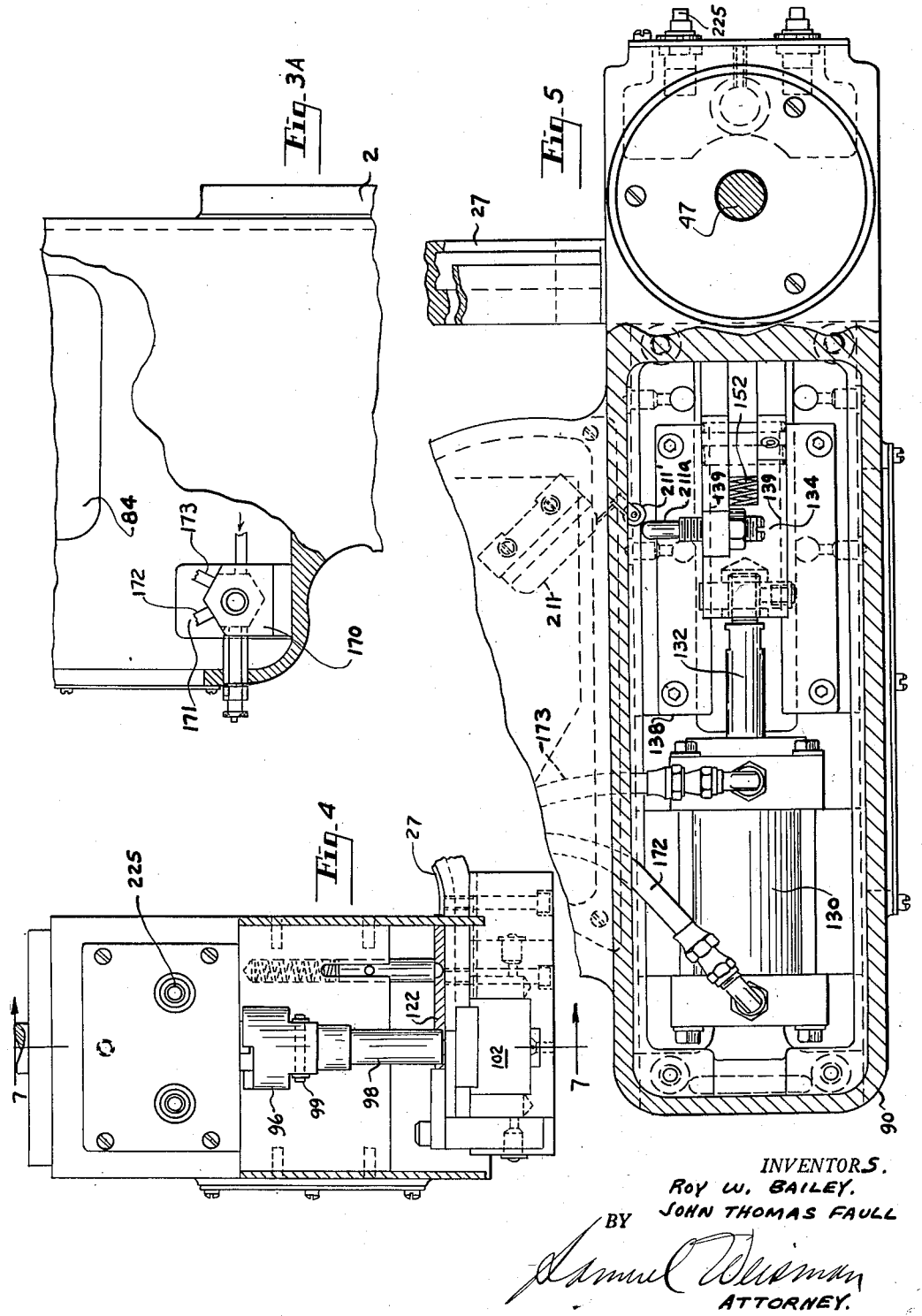

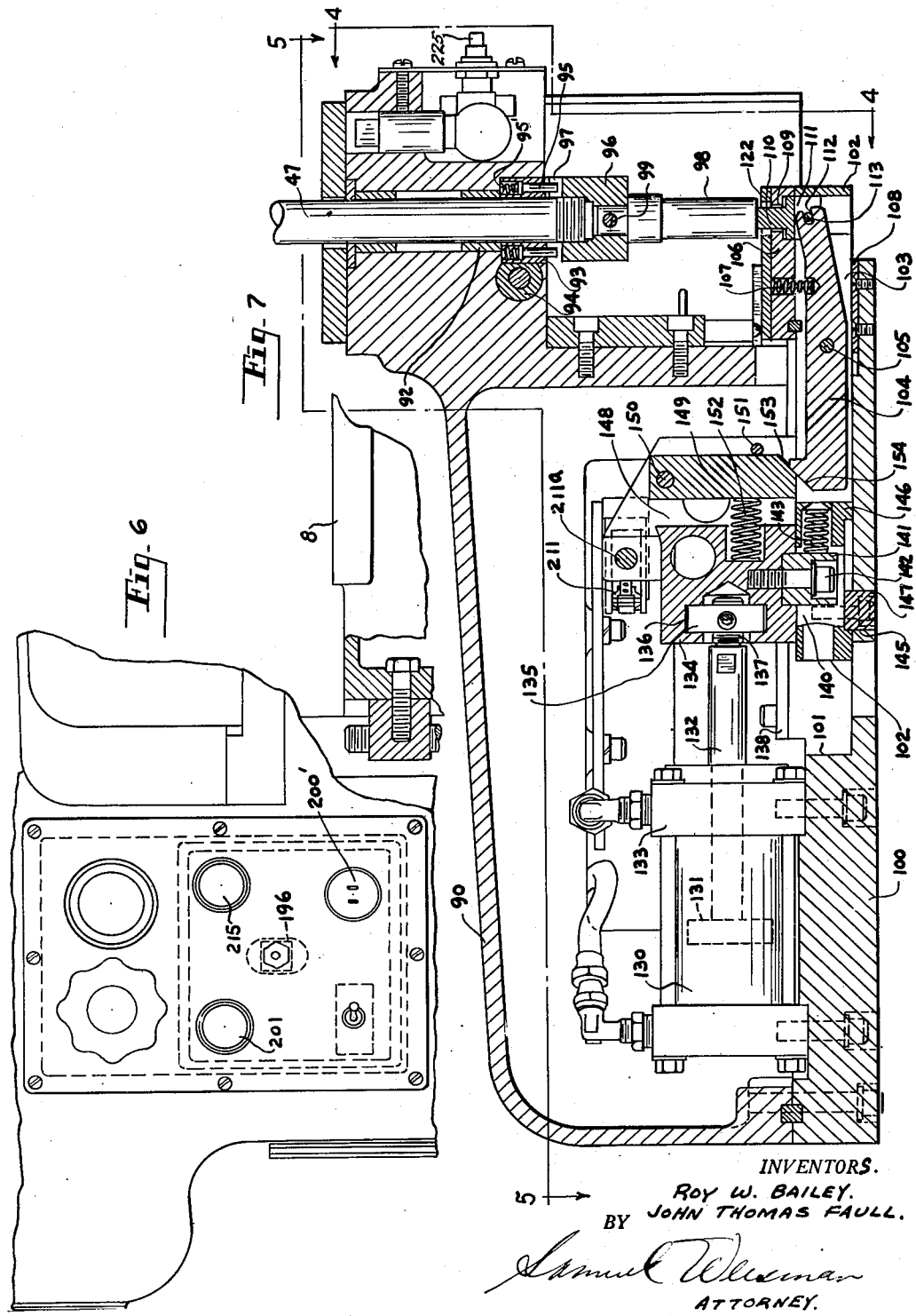

Feb. 17, 1953 R. W. BAILEY ET AL 2,628,520
MACHINE FOR ASSEMBLING A WORKPIECE ON ANOTHER PART
Filed May 8, 1952 7 Sheets-Sheet 6

INVENTORS.
ROY W. BAILEY.
JOHN THOMAS FAULL.
BY
ATTORNEY.

Feb. 17, 1953     R. W. BAILEY ET AL     2,628,520
MACHINE FOR ASSEMBLING A WORKPIECE ON ANOTHER PART
Filed May 8, 1952     7 Sheets-Sheet 7

INVENTORS.
ROY W. BAILEY.
JOHN THOMAS FAULL.
BY
*Samuel C. Wiseman*
ATTORNEY

Patented Feb. 17, 1953

2,628,520

UNITED STATES PATENT OFFICE 2,628,520

MACHINE FOR ASSEMBLING A WORKPIECE ON ANOTHER PART

Roy W. Bailey and John T. Faull, Detroit, Mich., assignors to Detroit Power Screwdriver Company, Detroit, Mich., a corporation of Michigan Application May 8, 1952, Serial No. 286,692

10 Claims. (Cl. 81—54)

1

This application is a continuation in part of our co-pending application Serial Number 102,343, filed June 30, 1949, now Patent No. 2,616,324, issued November 4, 1952, and involves disclosures made in our United States Patent Nos. 2,509,123 of May 23, 1950, and 2,577,946 of December 11, 1951.

The invention relates to a machine for driving a work piece, such as a nut, in which the piece is delivered mechanically into a rotating spindle which is then brought against a part on which the work piece is to be assembled. The piece is picked up from the track or similar slide by means of an injector assembly that slides the piece into axial alinement with the spindle. A rocking injector member in the injector assembly transfers the piece to the spindle.

The movements of the spindle and injector are synchronized with each other and are at least partly automatic. In this connection the principal object of the invention is to simplify the circuits shown in the co-pending application.

In general, the upward movement of the spindle to loading position energizes a circuit that projects the injector forward for the loading operation. When the injector reaches its forward limit, it automatically opens its projecting circuit and is retracted by a biased mechanism. The spindle is now brought down by closing an operator-controlled switch. After the driving operation, the spindle is retracted by another closing of the same switch.

Another object of the invention is to provide means for dispensing with the second closing of the operator-controlled switch, if desired, or to enable one up and down movement of the spindle by one operation of the switch. For this purpose there is provided in the spindle-actuating circuit a spindle return switch operable on the downward limit of the spindle to de-energize the spindle-actuating circuit and permit the spindle to be retracted by a mechanically biased mechanism. In addition the same circuit contains a control switch which is set in one position for the non-automatic operation and in another position for the automatic operation. In the non-automatic operation the spindle return switch is set to a position in which it does not function.

Another characteristic of the invention is the regulation of the driving stroke of the spindle in length and time. Such regulation is accomplished by an adjustment of the spindle return switch to a fixed position lengthwise of the spindle.

2

The invention is fully disclosed by way of example in the following description and in the accompanying drawings in which Figure 1 is a front perspective view of the machine;

Figure 2 is a rear elevation, partly in section;

Figure 3 is a section on the line 3—3 of Figure 1;

Figure 3A is a continuation of Figure 3;

Figure 8:
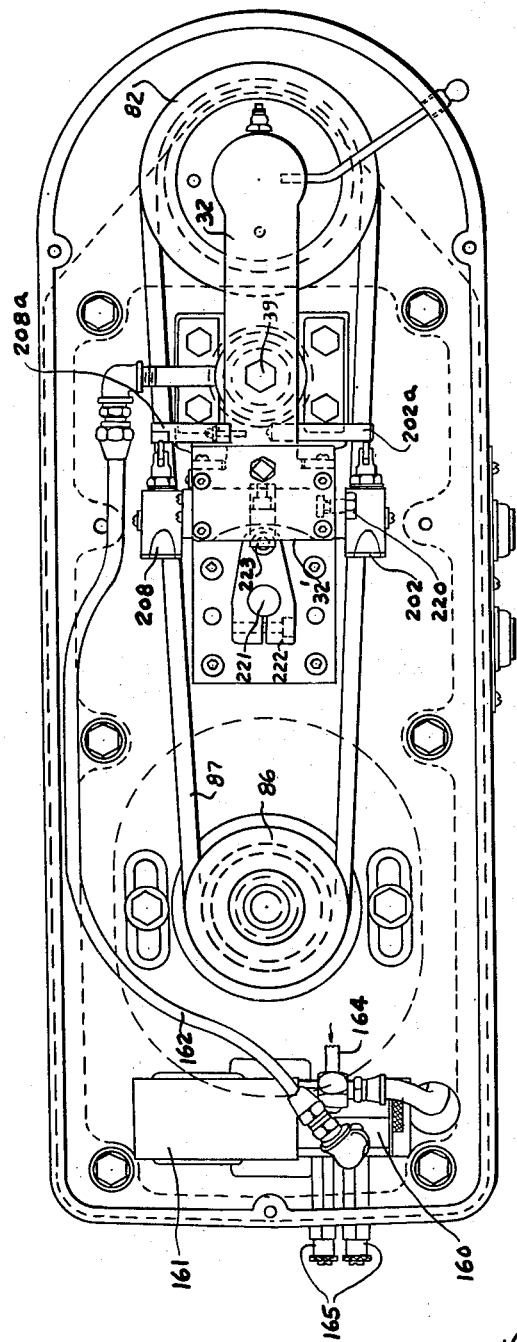

Figures 4 and 5 are sections on the lines 4—4 and 5—5 of Figure 7, respectively;

Figure 6 is a detail elevation;

Figure 7 is a section on the line 7—7 of Figure 4;

Figure 8 is a plan view on the line 8—8 of Figure 3;

Figure 9 is a wiring diagram, and

Figures 10, 11, 12 and 13 are illustrative details thereof.

Reference to these views will now be made by use of like characters which are employed to designate corresponding parts throughout.

Figure 1:
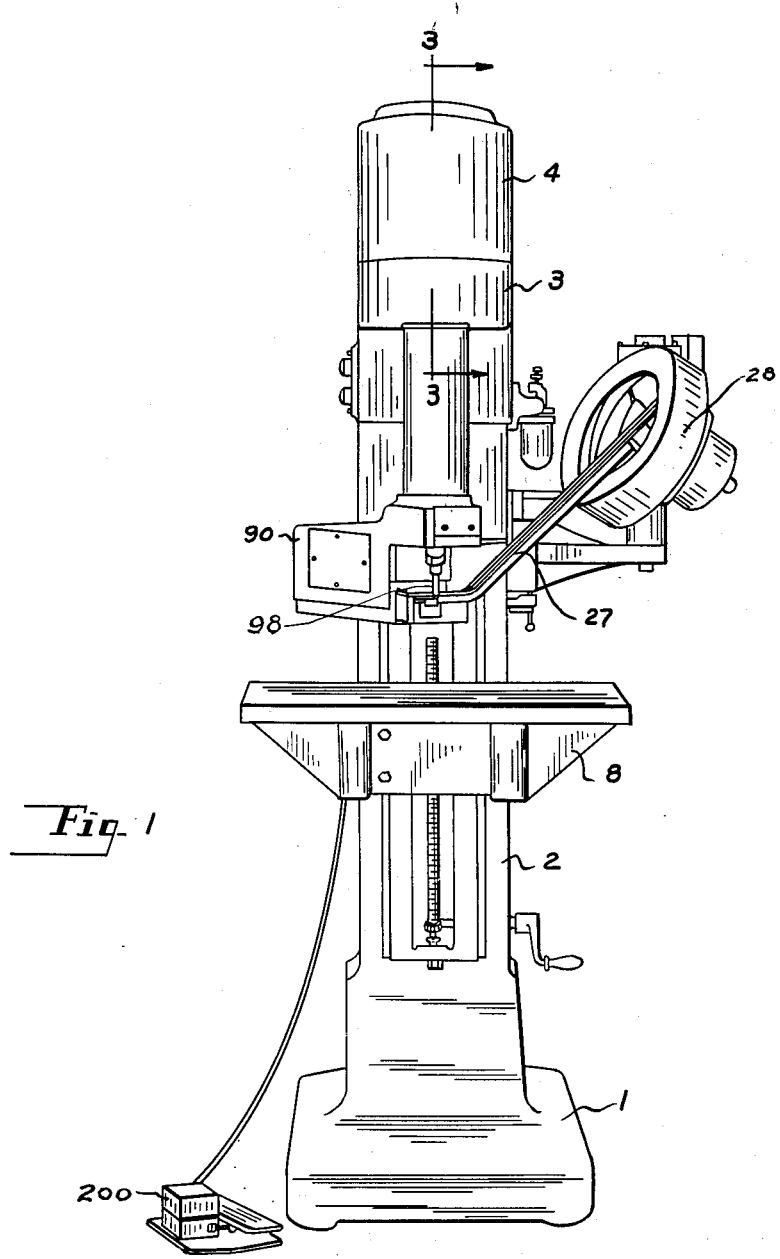

In Figure 1 is shown a machine base 1 on which is formed or built a column 2 in any suitable manner. At the upper end of the column is provided a head or top arm 3 fitted with a cover 4. The column carries the table 8 adjustable vertically as in Patent Number 2,509,123.

A track 27 delivers work piece to a location above the table 8 and to a power driven tool as will presently be described. The track 27 and a hopper 28 for delivering the pieces to the track are fully disclosed in the aforementioned patent and in Patent Number 2,060,182 of November 10, 1936.

On a shelf 30 mounted in the top arm 3 is secured a vertical track 31 for adjustably supporting various parts as will presently appear. In a side of the member 31 is slidably mounted an arm 32 from which is suspended an upper spindle 33 by means of a suitable bearing 34. A mounting 35 on the shelf 30 supports a vertical cylinder 38. A piston rod 39 fixed to the arm 32 passes through the upper cylinder head 40 to the piston 41 within the cylinder.

Beneath the top arm 3, the lower end of the upper spindle is enlarged and threaded at 45 to receive an upper clutch housing 46. The lower spindle 47 is suspended from the housing at 46 and is driven through a lower complementary clutch housing 56 as in Patent Number 2,509,123.

Through the bottom of the arm 3 is passed a sleeve 80 in which the upper spindle 33 slides and rotates. The sleeve 80 carries a ball bearing 81 for a pulley 82 which is splined at 83 on the spindle 33. Beneath the shelf 30 is supported an electric motor 84 with a vertical shaft 85 carrying another pulley 86. These two pulleys are in the same horizontal plane and are joined by a V-belt 87.

A laterally extending housing 90 is secured to the column 2 and is vertically adjustable thereon as in Patent Number 2,509,123. This housing contains mechanism for transferring nuts or other pieces from the track 27 to a tool such as a socket wrench carried by the lower spindle 47. The housing contains bushings 92 that receive the lower spindle as shown in Figure 7. The lower spindle 47 also passes through a bushing 93 secured in the housing 90 by a plug 94.

In the bushing 93 are axially mounted dogs or pawls 95 backed by springs 95' for a limited yielding movement inward. On the lower end of the spindle 47 is secured a complementary stop and adapter 96 formed on its upper end with a pair of diametrically opposed teeth 97 for selectively engaging the dogs 95. A bit or wrench 98 for receiving nuts is held in the adapter by a pin 99. The track 27 terminates at a point adjacent to the center line of the spindle, and the work pieces are moved from the track laterally to the projected center line of the spindle and beneath the wrench by suitable means such as disclosed in either of the aforementioned patents.

The floor 100 of the housing 90 is formed with a longitudinal recess 101, Figure 7, in which is mounted a slide 102. The slide is also formed with a longitudinal slot 103 in which is mounted an injector lever 104, in the nature of a rocker arm, on a pivot pin 105. A guide plate 106 is fastened upon the slide over the forward end of the lever 104. An interposed coil spring 107 tends to hold the arm downward. Beneath this arm a removable wear plate 108 is fastened to the floor 100.

The guide plate 106 is formed with a shouldered opening 109 in which is slidably mounted a shouldered injector pin 110. Beneath the plate 106, the pin 110 is slotted at 111 to receive the forward end of the lever 104. This end is forked at 112 to receive a cross pin 113 that bridges the slot 111.

On the plate 106 is located and secured a jaw 122 adapted to traverse the discharge end of the track 27 on movement of the slide 102. A complementary jaw (not shown) opposing the jaw 122 is yieldably mounted with respect to the jaw 122 to admit and grasp a work piece, as in the aforementioned patents.

For actuating the slide 102, a cylinder 130 is mounted on the floor 100 behind the cavity 101. The cylinder contains a horizontally movable piston 131 from which a piston rod 132 extends through the forward head 133.

A slide block 134 is attached to the piston rod by means of a nut 135 inserted in a slot 136 in the block and screwed on a threaded end 137 of the piston rod. Gibs 138 are mounted on the floor of the housing 90 along the edges of the slot 101 and extend into slots 139 along the lower edges of the block 134 for supporting and guiding the latter (Figure 5).

The slide 102 is formed with a vertical recess 140 behind the slot 103. In this recess is mounted, with considerable lengthwise play, a coupling plug 141 fastened to the underside of the block 134 by a screw 142. The forward side of the plug 141 is engaged by a coil spring 143 lying and seated lengthwise in the slide. In the bottom of the slide 102 is cut a lengthwise slot that forms a rear shoulder 145 and a forward shoulder 146 at opposite sides of the plug 141. The slide is limited in its forward movement by engagement of the shoulder 145 with a stop 147 in the floor 100 and is limited in its rearward movement by engagement of the shoulder 146 with the stop 147.

The forward end of the block 134 is formed with a vertical slot 148 in which is pivotally suspended a cam 149 by a cross pin 150 at its upper end. The cam bears forwardly against a cross pin 151 under the action of a coil spring 152 seated lengthwise in the block 134. The inclined cam surface 153 of the member 149 rises on a similar complementary surface 154 on the rear end of the rocker arm 104.

As the block 134 is advanced by pressure in the cylinder 130, the spring 143 is compressed by the plug 141 until it has sufficient rigidity to move the slide 102 or until the plug engages the forward end of the opening 140. The slide is thus advanced with the plug 134, and the rocker arm 104 moves along with the slide until the shoulder 145 engages the stop 147. However, there is relative movement between the block 134 and the rocker arm because of the play of the plug 141 in the recess 140 and the compression of the spring 143. The spring 152 holds the cam 149 against the pin 151 and causes the cam surface 153 to ride on the surface 154. The forward end of the rocker arm 104 is thereby lifted, raising the injector pin 110 and transferring the nut from the jaws into the bit 98. The pressure in the cylinder 130 is now reversed to retract the slide and the jaws, and the loaded bit 98 is brought down to the work as described in the aforementioned patent and application.

If the normal forward movement of the slide is obstructed the continuing forward movement of the plug 141 will be taken up by compression of the spring 143. In such case, or if the normal rocking of the arm 104 is obstructed, the continuing forward movement of the cam 149 will be taken up by compression of the spring 152, so that a breakage of parts is avoided in each case.

It will be noted that the injector pin 110 should not rise until the end of the forward stroke. The cam surface 154 is somewhat ahead of the surface 153 until the end of the stroke because of the clearance of the plug 141 in the opening 140 and the resulting incomplete compression of the spring 143 until the slide has nearly completed its forward stroke. As the stroke is completed the cam 149 rides up on the surface 154 and rocks the arm 104.

The spring 152 performs the additional function of accommodating a range of thicknesses of work pieces to be ejected from the jaws 122, 123. It is evident that the stroke of the injector pin 110 must be longer for greater thicknesses of work pieces. In a given size of machine, a given spring 152 is suitable for nuts or other work pieces varying in thickness from $\frac{1}{8}''$ to $\frac{7}{16}''$. In other words, a $\frac{7}{16}''$ piece can be thrown out of the jaws with this spring. With a thinner piece between the jaws, the stroke of the pin 110 is shorter, and the difference in movement is taken up by compression of the spring 152. In this connection it will be understood that the upward stroke of the pin 110 is stopped by the seating of the work piece in the bit 98. The stroke of the block 134, however, is constant, and the spring 152 compresses against the arrested cam 149.

On the rear end of the floor 30 is mounted a multiport slide valve 160 with a solenoid 161 for actuating the plug thereof. A line 162 extends from the valve to the top of the cylinder 38 to move the piston 41 downward and with it the spindle assembly. Another line 163 extends from the valve to the bottom of the cylinder 38 for the reverse movement. A line 164 admits air or other fluid to the valve after filtering and lubricating by suitable means, and the valve also has a pair of exhaust nipples 165 operative with the two strokes. This type of valve is well known in the art and therefore not described in detail. It is spring backed or biased to the spindle lifting position.

A similar valve 170 and operating solenoid 171 are suitably supported by the column 2 for oscillating the slide 102. A line 172 extends from the valve to the rear end of the cylinder 130 to project the slide and injector 104 rather forwardly, and another line 173 connects the valve to the forward end of the cylinder 130 for the reverse movement. The solenoids 161 and 171 are controlled by mechanism that will now be described. The valve is spring-backed or biased in the slide retracting direction.

Current for the operation of the machine is supplied through three-phase conductors 180 containing a main switch 181. The conductors contain a starter switch 182, and behind the switch are connected the spindle motor 84 and another motor 183 for driving the hopper as shown in the co-pending application. Across two of the conductors 180 is connected a transformer primary winding 184 which energizes a low voltage secondary winding 185. Terminal conductors 186 and 187 extend from the ends of the secondary, and across these conductors are connected various elements of the circuit. Some of these elements are contained in three conductors 188, 189 and 190 across the conductors 186 and 187.

The conductor 188 contains a push button starter switch 191 shunted by a hold-in switch 192. The same conductor contains a relay coil 193 and a normally closed push button stop switch 194. When the starter switch 191 is closed, the coil 193 attracts an armature 195 that closes the switches 182 and 192 as shown by the detail diagram, Figure 10, thereby delivering current to the motors 84 and 183.

The conductor 189 contains in series a spindle control switch 196, a hold-in switch 197 and a relay coil 198. A conductor 199 shunted across these parts contains a foot switch 200' for a foot switch 200 (Figure 1), and a pilot light 201. Outside the shunt conductor 199, the conductor 189 contains a spindle return switch 202 operated by spindle movement, as will presently be shown, and an emergency spindle lifting switch 203.

The conductor 190 contains a hold-in switch 204 and the spindle valve operating solenoid 161. When the foot switch 200' is closed, the coil 198 is energized through a conductor 205 connecting these parts. The coil 198 attracts an armature 206 that closes the switches 197 and 204 as shown in Figure 12. This operation occurs whether the switch 196 is open or closed, but the switches 202 and 203 must be closed.

Another conductor 207 joins the conductors 186 and 187 and contains an injector control switch 208, a normally closed switch 209 and the injector solenoid 171. Across the switch 209 and solenoid 171 is a shunt 210 containing a normally open switch 211 and a relay coil 212. As shown by the detail diagram in Figure 11, closing of the switch 211 causes the coil 212 to attract an armature 213 which opens the switch 209 and de-energizes the injector solenoid 171.

Across the switch 211 is connected a normally open switch 214 which is closed by the armature 213 when the switch 209 is opened as shown in Figure 11. A pilot light 215 is connected between the switch 214 and the conductor 187. Across the switch 214 is connected a push button injector switch 216. The same push button operates in like manner a switch 217 connected across the switches 208 and 209. A cut-off switch 218 is mounted in the conductor 186 between the conductors 188 and 189 to permit quick repair or adjustment of the mechanism without stopping the motors.

Figures 3 and 8 show the switches 202 and 208 as micro switches mounted on opposite sides of the vertical member 31, one above the other. These switches are of conventional construction and are closed by pressure on their respective rollers 202' and 208'. The spindle arm 32 carries a striker pin 202a for closing the switch 202 on the down stroke and a cam finger 208a for closing the switch on the up stroke. The switch 202 is lower and is adjustable vertically on the member 31 by a T-bolt 220.

Adjacent to the member 31, on the case thereof is mounted a vertical post 221 on which is adjustably clamped a stop arm 222. The vertical or slide portion 32' of the arm 32 carries a stop finger 223 adapted to engage a wear plug 224 in the arm 222, to limit the downward movement of the spindle when the nut is not to be driven tight.

In the operation of the device two methods of spindle control are available by adjustment of the spindle control switch 196. In the so-called manual operation, with the switch 196 open, operation of the foot switch 200 is required to start the spindle up and to start it down. In the automatic operation, with the switch 196 closed, a single closing of the foot switch 200 slides the spindle through a complete cycle, as will be described.

For manual operation the spindle return switch 202 is adjusted to the lowest position so that it is out of the path of the pin 202a. The starter switch 191 and stop switch 194 are closed. The foot switch 200 is then closed to energize the coil 197, thereby closing the switches 197 and 204. Switch 197 does not function here but rather as a hold-in for the automatic cycle as will presently be described.

Closing of the switch 204 energizes the spindle valve solenoid 161 and shifts the valve 160 to the position that brings the spindle down. Solenoid 161 is next de-energized, and the biased valve 160 shifts to the position that gives the spindle assembly an upward movement.

When the spindle reaches its upper limit, the striker finger 28a closes switch 208 and energizes the injector cylinder valve solenoid 171. The solenoid 171 shifts the valve 170 to the position that moves the injector slide 102 forward until it engages the stop 147. The injector cam slide block 134 continues forward until a striker pin 211a carried thereby engages the roller 211' of the normally open switch 211 (Figures 5 and 7).

Closed switch 211 passes current to the relay coil 212 which causes the armature 213 to close the switch 214 and open the switch 209. On opening of the switch 209, the valve solenoid 171 is de-energized, whereby the biased valve 170 shifts to the position that retracts the injector slide 102. The coil 212 remains energized through the switch 214, holding switch 209 open and the solenoid 171 de-energized until the switch 208 is again opened on the downward movement of the spindle.

In this interval the foot switch 200 is again closed to bring the spindle down and drive the work piece home. As the tool engages the work piece, the clutch 46, 56 engages to drive the lower spindle 47 as described in Patent Number 2,509,123. At the end of the desired downward movement of the spindle assembly, the foot switch 200 is released or opened to de-energize the coil 198 and open the switches 197 and 204.

The injector slide 102 may be operated independently of the spindle, if necessary, by pressing the push-button 225 which is on the housing (Figure 4) and common to the switches 216 and 217. The closed switch 217 bypasses the open switches 208 and 209 and energizes the injector solenoid 171 directly. If for some reason the injector slide becomes jammed in the forward position, it is necessary to energize the relay 212 which will open the switch 209 controlling the injector solenoid 171. The relay 212 is closed by the push-button 225 which closes switch 216 in the relay circuit, the switch 208 being closed by the spindle which is now up while the injector slide is forward.

The emergency switch 203 also located on the front of the injector housing opens the circuit to relay 198 and thus opens the switches 197 and 204 to the spindle valve solenoid 161, whereupon the spindle rises. The spindle is thus raised at any point during the downward movement in order to arrest the driving operation when a defect is discovered.

For automatic or piece part operation, the spindle control switch 196 is first set to closed position. A momentary contact through the foot switch 200 is all that is necessary for a complete up and down movement of the spindle. Closing of switch 200 momentarily energizes the relay coil 198 to close the hold-in switch 197. The normally closed switch 202 has been set in the path of the striker pin 202a. The energized coil 198 energizes the spindle valve solenoid 161 to bring the spindle down, as previously described. When the switch 202 is opened by the pin 202a at the downward limit of the spindle, the circuit for the coil 198 is broken and the solenoid 161 de-energized to raise the spindle as in the manual operation.

The pilot light 201 indicates when the coil 198 is energized in either the manual or the automatic circuit. The pilot light 215 is on while current is flowing in the injector relay coil 212.

The mechanical non-automatic cycle is as follows: Foot switch 200 is open, solenoid 161 de-energized, and biased spindle valve 160 brings spindle upward; spindle closes switch 208 to energize injector valve solenoid 171 and project injector slide 102 forward, and extreme forward movement of slide injects work piece into spindle socket; at extreme forward position of injector slide, switch 211 is closed, opening the injector solenoid circuit, and injector is retracted by its biased cylinder valve 170; foot switch 200 is closed to bring the spindle down and drive the work piece; foot switch is then opened to raise the spindle and repeat the cycle, the spindle return switch 202 having been set to an inoperative position out of the path of its operating finger 202a.

The mechanical cycle for the automatic operation is as follows: Spindle return switch 202 is set in the path of its finger 202a, and the manual control switch 196 is closed; momentary pressure on the foot switch 200, while the spindle is up, energizes the relay 198 to close the switches 197 and 204 thereby delivering current to the spindle solenoid 161 and bringing the spindle down; hold-in switch 197 remains closed although the foot switch 200 has now been opened, so that relay 198 remains closed to complete the downward movement of the spindle; as this movement is completed, the finger 202a opens the switch 202, and spindle returns upward by action of its biased valve 160; at the upward limit of the spindle movement, switch 208 is closed to actuate the injector slide as in the manual operation.

What we claim is:

1. A machine for assembling a work piece on another part, comprising a rotatable reciprocable spindle adapted to receive a work piece at one end, an injector slidable transversely of said spindle at said end and adapted to insert a work piece in said end, electrically operated means for bringing said spindle downward or toward said injector and counter-biased to retract said spindle, similar means for moving said injector forward or toward said spindle and counter-biased to retract said injector, an operator-actuated switch for controlling flow of current to the first means, a switch connected to the second means and closable by said spindle on the retraction thereof, and another switch connected to the second means and operable by said injector in the forward position to de-energize the second means, whereby the biased second means retracts the injector.

2. A machine set forth in claim 1, further characterized by emergency circuits to the second means for respectively energizing and de-energizing the second means independently of the aforementioned means and switches, and manually operable switches in the respective emergency circuits.

3. A machine for assembling a work piece on another part, comprising a rotatable reciprocable spindle adapted to receive a work piece at one end, an injector slidable transversely of said spindle at said end and adapted to insert a work piece in said end, electrically operated means for bringing said spindle downward or toward said injector and counter-biased to retract said spindle, similar means for moving said injector forward or toward said spindle and counter-biased to retract said injector, an operator-actuated switch for controlling flow of current to the first means, a switch connected to the second means and closable by said spindle on the retraction thereof, and another switch connected to the second means and operable by said injector in the forward position to de-energize the second means, whereby the biased second means retracts the injector, a normally closed spindle return switch mounted adjacent to said spindle and connected to the first means, an operating member for said return switch movable with said spindle and positioned to open said return switch on the downward movement of the spindle, whereby the first means retracts the spindle, said return switch being adjustable relatively to said operating member to an inoperative position.

4. A machine for assembling a work piece on another part, comprising a rotatable reciprocable spindle adapted to receive a work piece at one end, an injector slidable transversely of said spindle at said end and adapted to insert a work piece in said end, electrically operated means for bringing said spindle downward or toward said injector and counter-biased to retract said spindle, similar means for moving said injector forward or toward said spindle and counter-biased to retract said injector, an operator-actuated switch for controlling flow of current to the first means, a switch connected to the second means and closable by said spindle on the retraction thereof, and another switch connected to the second means and operable by said injector in the forward position to de-energize the second means, whereby the biased second means retracts the injector, a normally closed spindle return switch mounted adjacent to said spindle and connected to the first means, an operating member for said return switch movable with said spindle and positioned to open said return switch on the downward movement of the spindle, whereby the first means retracts the spindle, said return switch being adjustable relatively to said operating member to an inoperative position, a manual control switch between and in series with first means and said return switch, a normally open hold-in switch between and in series with said control switch and the first means and closable by the first means, said operator-controlled switch being connected across said control switch and said hold-in switch, between said return switch and the first means, whereby the first means becomes de-energized when the control switch is closed and the return switch is opened on downward movement of the spindle, without opening of the foot switch.

5. A machine for assembling a work piece on another part, comprising a rotatable reciprocable spindle adapted to receive a work piece at one end, an injector slidable transversely of said spindle at said end and adapted to insert a work piece in said end, a solenoid-operated means for bringing said spindle downward or toward said injector and counter-biased to retract said spindle, a relay for energizing said solenoid, another solenoid-operated means for moving said injector forward or toward said spindle and counterbalanced to retract the injector, an operator-actuated switch for controlling flow of current to the first means, a switch connected to the second means and closable by said spindle on the retraction thereof, and another switch connected to the second means and operable by said injector in the forward position to de-energize the second means, whereby the biased second means retracts the injector.

6. A machine for assembling a work piece on another part, comprising a rotatable reciprocable spindle adapted to receive a work piece at one end, an injector slidable transversely of said spindle at said end and adapted to insert a work piece in said end, a solenoid-operated means for bringing said spindle downward or toward said injector and counter-biased to retract said spindle, a relay for energizing said solenoid, another solenoid-operated means for moving said injector forward or toward said spindle and counterbalanced to retract the injector, an operator-actuated switch for controlling flow of current to the first means, a switch connected to the second means and closable by said spindle on the retraction thereof, and another switch connected to the second means and operable by said injector in the forward position to de-energize the second means, whereby the biased second means retracts the injector, a normally closed spindle return switch mounted adjacent to said spindle and connected to said relay, an operating member for said return switch movable with said spindle and positioned to open said return switch on the downward movement of the spindle, whereby the first means retracts the spindle, said return switch being adjustable relatively to said operating member to an inoperative position.

7. A machine for assembling a work piece on another part, comprising a rotatable reciprocable spindle adapted to receive a work piece at one end, an injector slidable transversely of said spindle at said end and adapted to insert a work piece in said end, a solenoid-operated means for bringing said spindle downward or toward said injector and counter-biased to retract said spindle, a relay for energizing said solenoid, another solenoid-operated means for moving said injector forward or toward said spindle and counterbalanced to retract the injector, an operator-actuated switch for controlling flow of current to the first means, a switch connected to the second means and closable by said spindle on the retraction thereof, and another switch connected to the second means and operable by said injector in the forward position to de-energize the second means, whereby the biased second means retracts the injector, a normally closed spindle return switch mounted adjacent to said spindle and connected to said relay, an operating member for said return switch movable with said spindle and positioned to open said return switch on the downward movement of the spindle, whereby the first means retracts the spindle, said return switch being adjustable relatively to said operating member to an inoperative position, a manual control switch between and in series with said relay and said return switch, a normally open hold-in switch between and in series with said control switch and said relay and closable by said relay, said operator-controlled switch being connected across said manual control switch and said hold-in switch, between said return switch and said relay, whereby the first means becomes de-energized when the control switch is closed and the return switch is opened on downward movement of the spindle, without opening of the foot switch.

8. A machine for assembling a work piece on another part, comprising a rotatable reciprocable spindle adapted to receive a work piece at one end, an injector slidable transversely of said spindle at said end and adapted to insert a work piece in said end, a solenoid-operated means for bringing said spindle downward or toward said injector and counter-biased to retract said spindle, a relay for energizing said solenoid, electrically-operated means for moving said injector forward or toward said spindle and counter-biased to retract said injector, an operator-actuated switch for controlling flow of current to the first means, a switch connected to the second means and closable by said spindle on the retraction thereof, and another switch connected to the second means and operable by said injector in the forward position to de-energize the second means, whereby the biased second means retracts the injector.

9. A machine as set forth in claim 8, further characterized by a normally closed spindle return switch mounted adjacent to said spindle and connected to said relay, an operating member for said return switch movable with said spindle and positioned to open said return switch on the downward movement of the spindle, whereby the first means retracts the spindle, said return switch being adjustable relatively to said operating member to an inoperative position.

10. A machine as set forth in claim 8, further characterized by a normally closed spindle return switch mounted adjacent to said spindle and connected to said relay, an operating member for said return switch movable with said spindle and positioned to open said return switch on the downward movement of the spindle, whereby the first means retracts the spindle, said return switch being adjustable relatively to said operating member to an inoperable position, a manual control switch between and in series with said relay and said return switch, a normally open hold-in switch between and in series with said control switch and said relay and closable by said relay, said operator-controlled switch being connected across said manual control switch and said hold-in switch, between said return switch and said relay, whereby the first means becomes de-energized when the control switch is closed and the return switch is opened on downward movement of the spindle, without opening of the foot switch.

ROY W. BAILEY.
JOHN T. FAULL.

No references cited.